United States Patent
Takabayashi et al.

(10) Patent No.: US 6,404,518 B2
(45) Date of Patent: Jun. 11, 2002

(54) FULL-COLOR HOLOGRAM AND METHOD OF PRODUCING THE SAME

(75) Inventors: Emi Takabayashi; Kenji Ueda; Masachika Watanabe; Tsuyoshi Kashiwagi, all of Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 09/772,953

(22) Filed: Jan. 31, 2001

(30) Foreign Application Priority Data

Jan. 31, 2000 (JP) ........................ 2000-021568
Jan. 12, 2001 (JP) ........................ 2001-004944

(51) Int. Cl.[7] ................................ G03H 1/26
(52) U.S. Cl. ........................ 359/22; 359/3; 359/24; 359/27
(58) Field of Search ................ 359/1, 15, 22, 359/24, 27, 3

(56) References Cited

U.S. PATENT DOCUMENTS 4,235,505 A * 11/1980 Hariharan et al. ............ 359/24
5,182,180 A * 1/1993 Gambogi, Jr. et al. ........ 359/1
5,812,229 A * 9/1998 Chen et al. ................. 359/15

OTHER PUBLICATIONS

Noguchi, "Color Reproduction by Multicolor Holograms with White–Light Reconstruction", Mar. 1973, Applied Optics, vol. 12, No. 3, pp. 496–499.*

* cited by examiner

Primary Examiner—Cassandra Spyrou
Assistant Examiner—Leo Boutsikaris
(74) Attorney, Agent, or Firm—Sughrue, Mion, PLLC

(57) ABSTRACT

A full-color hologram capable of generating a bright image and reproducing colors in all color regions is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively.

9 Claims, 8 Drawing Sheets

FULL-COLOR HOLOGRAM AND METHOD OF PRODUCING THE SAME

BACKGROUND OF THE INVENTION

The present invention relates to a full-color hologram and a method of producing the same. More particularly, the present invention relates to a full-color hologram capable of generating a bright image and reproducing colors in all color regions with favorable reproducibility and also relates to a method of producing the full-color hologram.

Conventionally, a hologram original plate for color holograms and a duplicate thereof are made by multiple recording or multilayer recording using three laser light having three wavelengths in the three primary color regions of blue, green and red, i.e. 400 nm to 500 nm (blue), 500 nm to 600 nm (green), and 600 nm to 700 nm (red).

Meanwhile, a proposition is made in Applied Optics Vol. 12, No. 3, pp. 496–499 to form a multicolor hologram from holograms recorded separately by using laser light of four wavelengths, i.e. 476.2 nm, 520.8 nm, 568.2 nm and 632.8 nm.

When a color hologram recorded with the above-described three wavelengths is illuminated with a white light source to reconstruct a holographic image, colors cannot satisfactorily be reproduced. Therefore, the reconstructed image is inferior in color tone reproduction and unfavorably dark.

Methods for producing holograms capable of generating bright images include one that uses a wavelength (550 nm to 560 nm) in the vicinity of the peak wavelength 555 nm of a spectral luminous efficiency curve as a reconstruction wavelength for green. However, when a wavelength in the range of 550 nm to 560 nm is recorded as a reconstruction wavelength in the green region, if the reconstruction wavelength for blue is 458 nm, as shown in FIG. 11, blue green in the chromaticity diagram cannot be reproduced. If 488 nm is used as a reconstruction wavelength for blue, the full shade of blue cannot be reproduced. It is very difficult with the recording using three wavelengths to realize satisfactory color reproduction such as to express colors in all color regions divided into 23 sections on the chromaticity diagram (in the chromaticity diagram, it is possible to reproduce only colors within a triangle formed by connecting three wavelengths with straight lines. In FIG. 11, 630 nm is used as a reconstruction wavelength for red. It should be noted that the chromaticity diagram is quoted from "JIS Handbook Color").

On the other hand, the above-described proposition to record a multicolor hologram by using four wavelengths considers mainly white color reproduction and makes no proposition concerning how to select recording wavelengths to construct a full-color hologram capable of generating a bright image and reproducing colors in all color regions.

SUMMARY OF THE INVENTION

The present invention was made in view of the above-described problems with the prior art. An object of the present invention is to provide a full-color hologram recorded with four wavelengths, which is capable of generating a bright image and reproducing colors in all color regions, and also provide a method of producing the full-color hologram.

To attain the above-described object, the present invention provides a full-color hologram formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively.

In addition, the present invention provides a method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. In the full-color hologram producing method, as one recording wavelength in the green region, 514.5 nm from an argon laser or 532 nm from an LD pumped laser is used, and as another recording wavelength in the green region, a wavelength not shorter than 555 nm is used.

In this case, it is desirable that as the another recording wavelength in the green region, a wavelength in the range of 565 nm to 590 nm should be used, and that the reconstruction wavelengths should be shifted 15 nm to 40 nm to the shorter wavelength side by shrinkage of a photosensitive material after recording or by wavelength shift effected by a pressure-sensitive adhesive.

As the another recording wavelength in the green region, a wavelength in the range of 565 nm to 600 nm from a dye laser may be used.

In addition, the present invention provides another method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. The full-color hologram is made by holographic duplication from a hologram original plate. In the full-color hologram producing method, the hologram original plate is formed from a stack of four layers of photosensitive material, each layer containing a hologram recorded for each corresponding wavelength.

In addition, the present invention provides a further method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. The full-color hologram is made by holographic duplication from a hologram original plate. In the full-color hologram producing method, the hologram original plate is formed as follows. A wavelength in the red region and one wavelength in the green region are recorded in the same layer of photosensitive material. A wavelength in the blue region and another wavelength in the green region are recorded in the same layer of photosensitive material that is different from the first-mentioned layer. The two layers are stacked on top of each other to form a hologram original plate.

In addition, the present invention provides a still further method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. The full-color hologram is made by holographic duplication from a hologram original plate. In the full-color hologram producing method, the hologram original plate is formed as follows. A wavelength in the red region is recorded in a layer of photosensitive material. Two wavelengths in the green region are recorded in the same layer of photosensitive material that is different from the layer in which the wavelength in the red region has been recorded. A wavelength in the blue region is recorded in a layer of photosensitive material that is different from the former two layers. The three layers are stacked on top of each other to form a hologram original plate.

In addition, the present invention provides a still further method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. The full-color hologram is made by holographic duplication from a hologram original plate. In the full-color hologram producing method, the hologram original plate is formed as follows. A wavelength in the red region is recorded in a layer of photosensitive material. One wavelength in the green region is recorded in a layer of photosensitive material that is different from the layer in which the wavelength in the red region has been recorded. Another wavelength in the green region and a wavelength in the blue region are recorded in the same layer of photosensitive material that is different from the former two layers. The three layers are stacked on top of each other to form a hologram original plate.

In addition, the present invention provides a still further method of producing a full-color hologram. The full-color hologram is formed by multiple recording or multilayer recording with four different dominant wavelengths for reconstruction. The full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. The full-color hologram is made by holographic duplication from a hologram original plate. In the full-color hologram producing method, the hologram original plate is formed by recording four wavelengths in the same layer of photosensitive material.

In the present invention, the full-color hologram has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. Therefore, it is possible to obtain a full-color hologram capable of generating a bright image and reproducing colors in all color regions with favorable reproducibility.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principles and embodiments of the full-color hologram and the method of producing the same according to the present invention will be described below.

Figure 10:
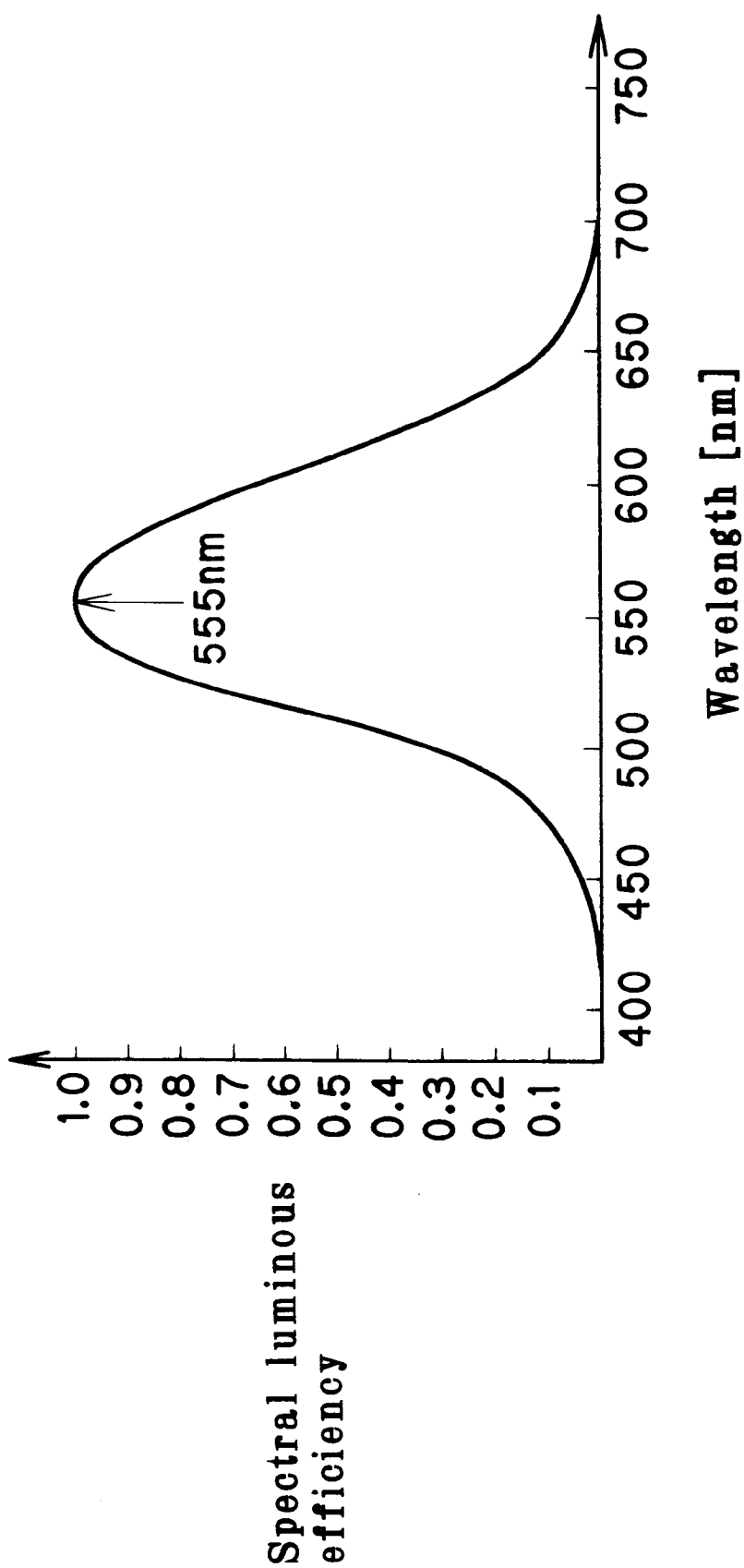
FIG. 10 is a diagram showing the spectral luminous efficiency curve of the human photopic vision.

As shown in FIG. 10, the spectral luminous efficiency curve of the human photopic vision has a peak at the wavelength of 555 nm. Therefore, if a color hologram is recorded so that one of reconstruction wavelengths thereof is in the vicinity of the peak wavelength 555 nm of the spectral luminous efficiency curve, i.e. in the range of 550 nm to 560 nm, the holographic image of the color hologram appears to be the brightest to the observer.

Accordingly, in the present invention, a four-wavelength recording type volume color hologram is recorded so that one of reconstruction wavelengths thereof is in the vicinity of the peak wavelength 555 nm of the spectral luminous efficiency curve, i.e. in the range of 550 nm to 560 nm. If one of the reconstruction wavelengths is not in the range of 550 nm to 560 nm, even if the hologram is recorded so as to have the same diffraction efficiency, the holographic image thereof will not appear to be very bright to the observer.

Figure 1:
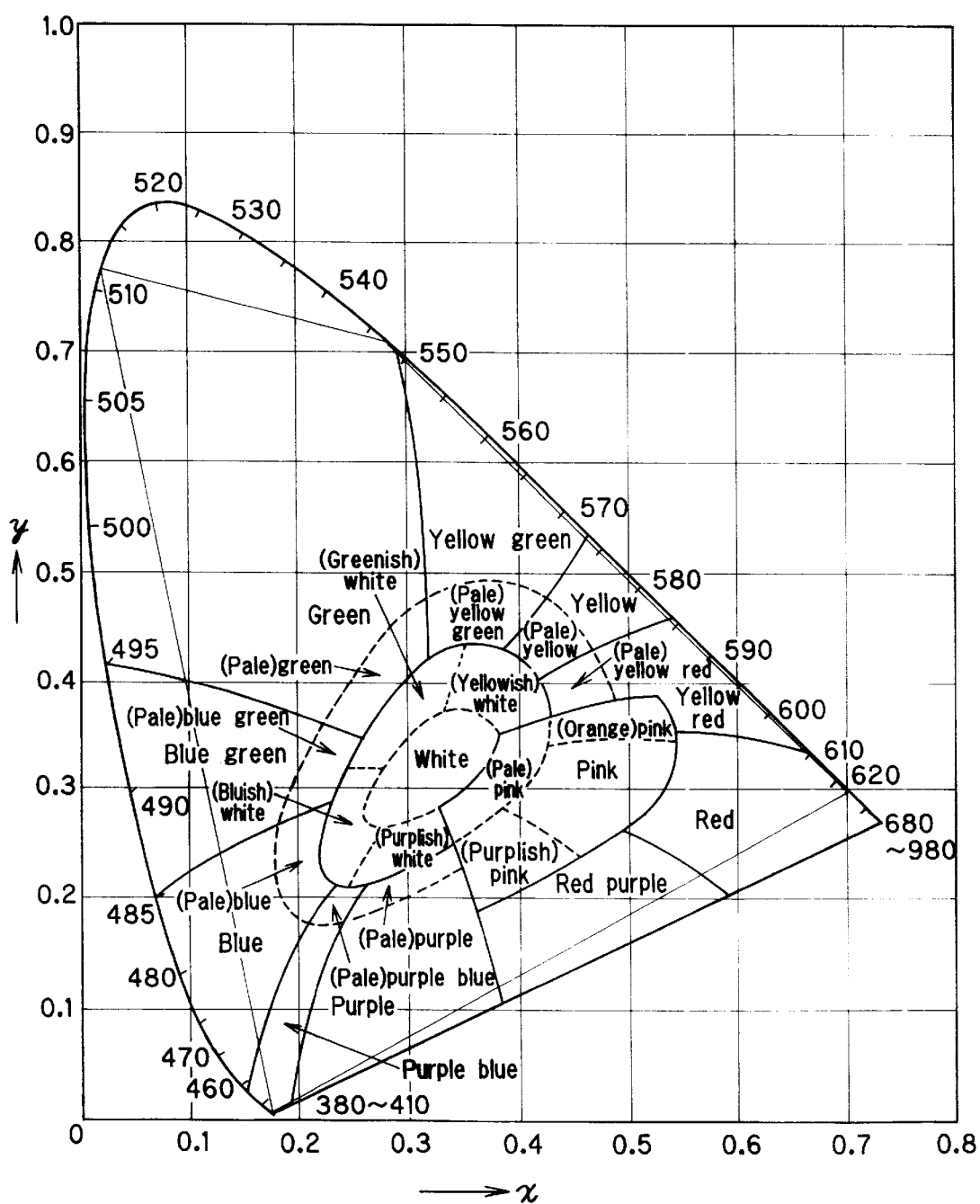
FIG. 1 is a chromaticity diagram showing the range of colors reproducible by the full-color hologram according to the present invention.
Figure 11:
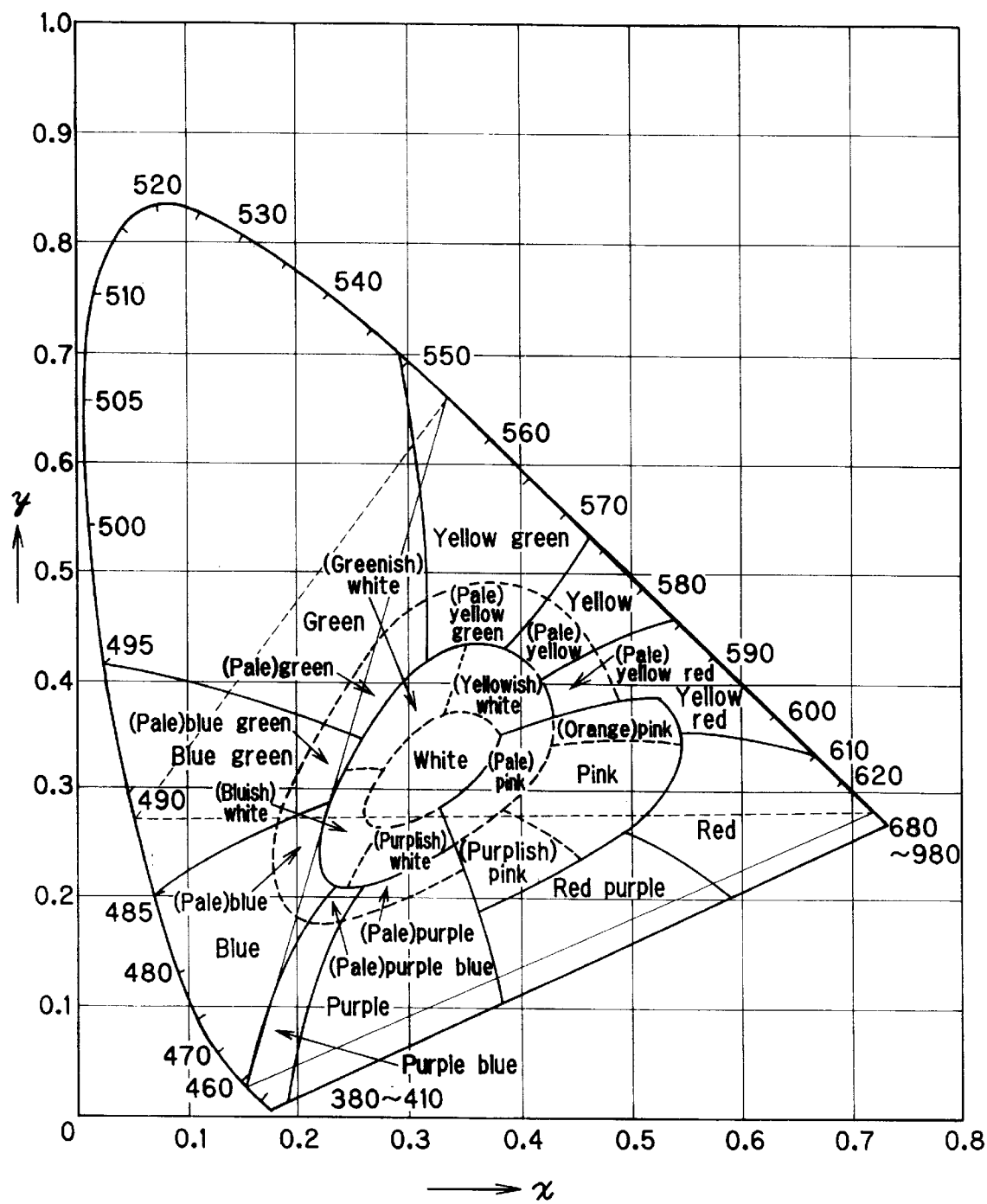
FIG. 11 is a chromaticity diagram showing the range of colors reproducible by a conventional hologram recorded with three wavelengths.

If a wavelength in the range of 550 nm to 560 nm is used as a reconstruction wavelength for green, a full-color hologram is recorded so as to have three other different reconstruction wavelengths, i.e. four wavelengths in total, with a view to improving color reproduction. In a case where a white light source is used as an illuminating light source, a color hologram photographically recorded by using four or more laser light in the three primary color regions of red (R), green (G) and blue (B) provides a reconstructed image that is more improved in color tone reproduction and brighter than in the case of recording with three wavelengths. These advantageous effects are particularly remarkable when four reconstruction wavelengths are selected as follows. A wavelength in the above-described range of 550 nm to 560 nm is selected as one of the four reconstruction wavelengths, and a wavelength in the range of 380 nm to 470 nm is selected as a wavelength in the blue region. Further, a wavelength in the range of 485 nm to 515 nm is selected as a wavelength in the green region, and a wavelength in the range of 615 nm to 680 nm is selected as a wavelength in the red region. By using the four wavelengths, as shown in FIG. 1, the range of reproducible colors on the xy chromaticity diagram can be made wider to a considerable extent than in the case of the conventional hologram recorded with three wavelengths (FIG. 11). It should be noted that the four reconstruction wavelengths in FIG. 1 are those used in the hologram according to a first embodiment stated below.

It should be noted that if wavelengths other than that in the 550 nm to 560 nm are not within the respective ranges of 380 nm to 470 nm, 485 nm to 515 nm, and 615 nm to 680 nm, it becomes difficult to express colors in all color regions divided into 23 sections on the chromaticity diagram, as will be clear from the diagram.

The following is a description of a specific example of a method of producing a Denisyuk hologram using another laser light in addition to three laser light in the three primary color regions of blue, green and red as recording wavelengths.

In the first embodiment, the following wavelengths of laser light are used for recording. As a wavelength of blue, 458 nm from an argon laser is used. As one wavelength in the green region, 532 nm from an LD pumped laser is used, and 573 nm from a dye laser excited with the wavelength of 532 nm is used as another wavelength in the green region. As a wavelength of red, 647 nm from a Kr laser is used.

Three layers of photosensitive material are used. Regarding the photosensitive material of each layer, a photopolymer HRF800X001 (manufactured by Du Pont Co., Ltd.) is used as a volume hologram photosensitive material.

Figure 2:
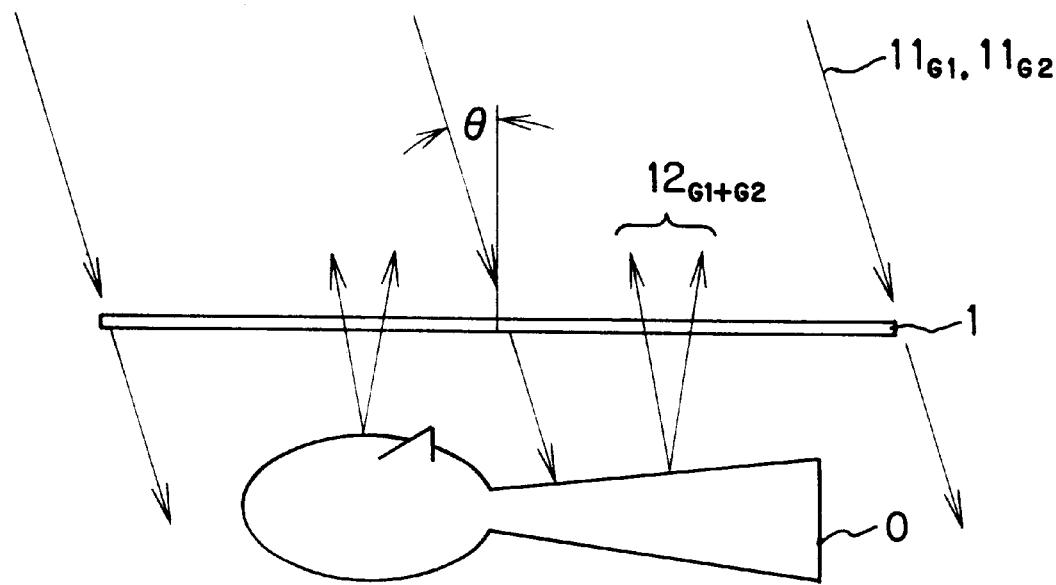
FIG. 2 is a diagram showing a first step of a process of producing a Denisyuk hologram according to a first embodiment of the present invention.

First, as shown in FIG. 2, a photosensitive material 1 for a first layer is placed over a glass plate (not shown) with a pressure-sensitive adhesive layer interposed therebetween. An object O, e.g. a three-dimensional model, is placed on the reverse side of the photosensitive material 1 at a distance therefrom. With this arrangement, dye laser light $11_{G1}$ of 573 nm in the green region and LD pumped laser light $11_{G2}$ of 532 nm as another wavelength in the green region are applied at an incident angle θ from the photosensitive material 1 side as illuminating light with a total exposure energy of 10 mJ/cm². Consequently, the illuminating light $11_{G1}+11_{G2}$ passes through the photosensitive material 1 and is incident on the object O. As a result, scattered light $12_{G1+G2}$ is produced in the reflection direction from the object O. The scattered light $12_{G1+G2}$ and the illuminating light $11_{G1}+11_{G2}$ interfere with each other in the photosensitive material 1. Thus, a hologram of the object O for the wavelength of 532 nm and a hologram of the object O for the wavelength of 573 nm are double-recorded in the photosensitive material 1. Then, the photosensitive material 1 is subjected to prescribed UV irradiation and baking as post-treatment.

Figure 3:
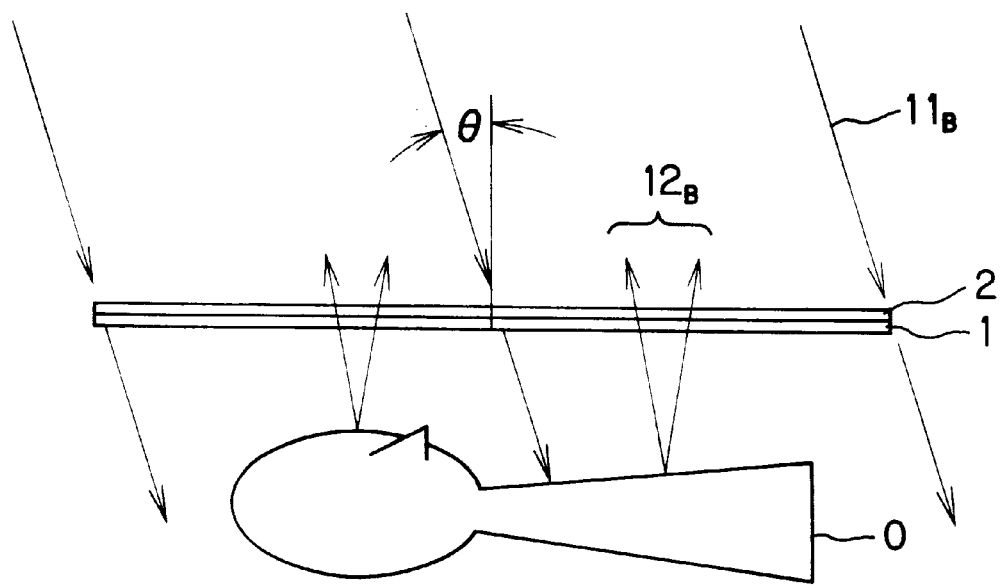
FIG. 3 is a diagram showing a step subsequent to the step of the process shown in FIG. 2.

Next, as shown in FIG. 3, a photosensitive material 2 for a second layer is stacked over the first-layer photosensitive material 1 treated as described above with a pressure-sensitive adhesive layer interposed therebetween. Then, the object O is placed on the reverse side of the photosensitive material 2 in the same positional relationship as in FIG. 2. With this arrangement, argon laser light $11_B$ of wavelength 458 nm in the blue region is applied at the same incident angle θ from the photosensitive material 2 side as illuminating light with an exposure energy of 10 mJ/cm². Consequently, the illuminating light $11_B$ passes through both the photosensitive material 2 and the already-exposed photosensitive material 1 (which has already been fixed to become inert at this stage) and is incident on the object O. As a result, scattered light $12_B$ is produced in the reflection direction from the object O. The scattered light $12_B$ and the illuminating light $11_B$ interfere with each other in the photosensitive material 2. Thus, a hologram of the object O for the wavelength of 458 nm is recorded in the photosensitive material 2. Then, the photosensitive material 2 is subjected to prescribed UV irradiation and baking as post-treatment.

Figure 4:
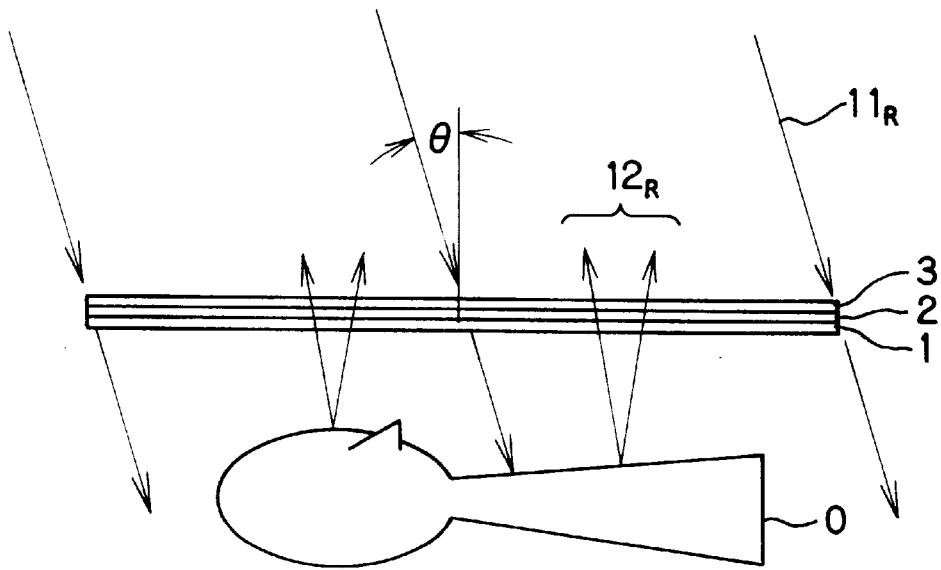
FIG. 4 is a diagram showing a step subsequent to the step of the process shown in FIG. 3.

Next, as shown in FIG. 4, a photosensitive material 3 for a third layer is stacked over the second-layer photosensitive material 2 treated as described above with a pressure-sensitive adhesive layer interposed therebetween. Then, the object O is placed on the reverse side of the photosensitive material 3 in the same positional relationship as in FIGS. 2 and 3. With this arrangement, Kr laser light $11_R$ of wavelength 647 nm in the red region is applied at the same incident angle θ from the photosensitive material 3 side as illuminating light with an exposure energy of 20 mJ/cm². Consequently, the illuminating light $11_R$ passes through the photosensitive material 3 and the already-exposed photosensitive materials 1 and 2 and is incident on the object O. As a result, scattered light $12_R$ is produced in the reflection direction from the object O. The scattered light $12_R$ and the illuminating light $11_R$ interfere with each other in the photosensitive material 3. Thus, a hologram of the object O for the wavelength of 647 nm is recorded in the photosensitive material 3. Then, the photosensitive material 3 is subjected to prescribed UV irradiation and baking as post-treatment.

Figure 5:
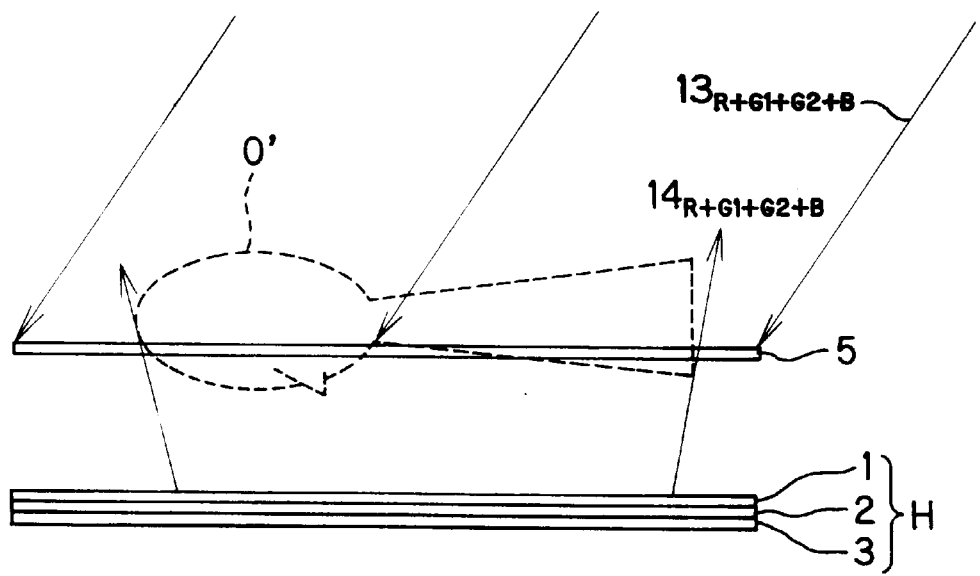
FIG. 5 is a diagram showing a process of reproducing a hologram from a hologram original plate obtained by the process shown in FIGS. 2 to 4.

Thus, a hologram original plate H is formed from a stack of three layers subjected to exposure and post-treatment for each wavelength. The hologram original plate H is used to reproduce a full-color hologram in a photosensitive material consisting essentially of a single layer of volume hologram photosensitive material [photopolymer HRF800X001 (manufactured by Du Pont Co., Ltd.)] by using the same four wavelengths. For this purpose, as shown in FIG. 5, another photosensitive material 5 is placed in the vicinity of the position of the object O at the time of photographically recording the hologram original plate H. Then, illuminating light $13_{R+G1+G2+B}$ of the same four wavelengths 647 nm, 573 nm, 532 nm and 458 nm as those used at the time of recording the hologram original plate H is applied simultaneously from the photosensitive material 5 side in a direction opposite to the direction of incidence of the illuminating light $11_{G1}$, $11_{G2}$, $11_B$ and $11_R$ at the time of making the hologram original plate H. Consequently, the illuminating light $13_{R+G1+G2+B}$ passes through the photosensitive material 5 and is incident on the hologram original plate H. As a result, diffracted light $14_{R+G1+G2+B}$ is produced in the reflection direction from the hologram original plate H and reconstructs a real image O' of the recorded object O in the vicinity of the plane of the photosensitive material 5. The diffracted light $14_{R+G1+G2+B}$ and the illuminating light $13_{R+G1+G2+B}$ interfere with each other in the photosensitive material 5. Thus, a full-color hologram image of the object O is recorded in the photosensitive material 5.

With respect to the hologram reproduced in this way, a pressure-sensitive adhesive stated in Japanese Patent Application No. Hei 10-97345 "Volume Hologram Laminate and Label for Producing Volume Hologram Laminate" filed by the present applicant is stacked on the hologram photosensitive material layer 5 to shift the center wavelengths to the shorter wavelength side. More specifically, PET (polyethylene terephthalate) film provided as a protective layer for the surface of the reproduced hologram is removed. Thereafter, a pressure-sensitive adhesive PL THIN (manufactured by Lintec Corporation) applied on PET film is bonded to the surface of the hologram, together with the PET film. Then, prescribed UV irradiation is carried out. A similar pressure-sensitive adhesive PL THIN is bonded to the reverse side of the hologram, together with the PET film. At this time, shrinkage of the pressure-sensitive adhesive causes each reconstruction wavelength of the hologram to shift about 20 nm to the shorter wavelength side as follows.

Reconstruction wavelength of red R:
647 nm→627±5 nm

Reconstruction wavelength 1 of green G1:
573 nm→553±5 nm

Reconstruction wavelength 2 of green G2:
532 nm→512±5 nm

Reconstruction wavelength of blue B:
458 nm→438±5 nm

When the hologram produced in this way is illuminated with white light to reconstruct a holographic image, the above-described four reconstruction wavelengths are available as dominant wavelengths. Thus, it is possible to obtain a full-color hologram providing a brighter image and a wider color reproduction range and exhibiting more improved color reproduction than in the case of the conventional hologram recorded with three wavelengths.

In a second embodiment of the present invention, a full-color hologram is produced in the same way as in the first embodiment except that laser light $11_{G2}$ of 514.5 nm from an argon laser is used as the another wavelength in the green region at the time of recording the original plate in place of the LD pumped laser light of 532 nm used in the first embodiment. The reconstruction wavelengths of the reproduced hologram are shifted about 20 nm to the shorter wavelength side by shrinkage of the same pressure-sensitive adhesive as follows.

Reconstruction wavelength of red R:
647 nm→627±5 nm

Reconstruction wavelength 1 of green G1:
573 nm→553±5 nm

Reconstruction wavelength 2 of green G2:
514.5 nm→495±5 nm

Reconstruction wavelength of blue B:
458 nm→438±5 nm

In this case also, when the hologram is illuminated with white light to reconstruct a holographic image, the above-described four reconstruction wavelengths are available as dominant wavelengths. Thus, it is possible to obtain a full-color hologram providing a brighter image and a wider color reproduction range and exhibiting more improved color reproduction than in the case of the conventional hologram recorded with three wavelengths.

Next, in a third embodiment of the present invention, the following wavelengths of laser light are used for recording. As a wavelength of blue, 458 nm from an argon laser is used. As one wavelength in the green region, 514.5 nm from an argon laser is used, and 580 nm of dye laser excited with light of wavelength 532 nm from an LD pumped laser is used as another wavelength in the green region. As a wavelength of red, 647 nm from a Kr laser is used.

Two layers of photosensitive material are used. Regarding the photosensitive material of each layer, a photopolymer HRF800X001 (manufactured by Du Pont Co., Ltd.) is used as a volume hologram photosensitive material.

Figure 6:
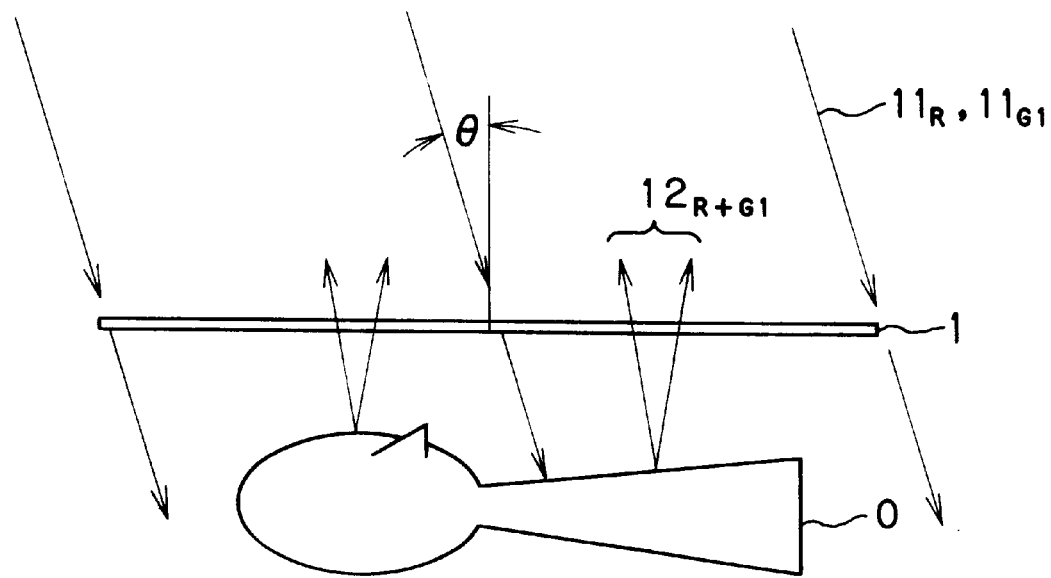
FIG. 6 is a diagram showing a first step of a process of producing a Denisyuk hologram according to a third embodiment of the present invention.

First, as shown in FIG. 6, a photosensitive material 1 for a first layer is placed over a glass plate (not shown) with a pressure-sensitive adhesive layer interposed therebetween. An object O, e.g. a three-dimensional model, is placed on the reverse side of the photosensitive material 1 at a distance therefrom. With this arrangement, Kr laser light $11_R$ of 647 nm in the red region and dye laser light $11_{G1}$ of 580 nm in the green region are applied at an incident angle θ from the photosensitive material 1 side as illuminating light with a total exposure energy of 15 mJ/cm$^2$. Consequently, the illuminating light $11_R+11_{G1}$ passes through the photosensitive material 1 and is incident on the object O. As a result, scattered light $12_{R+G1}$ is produced in the reflection direction from the object O. The scattered light $12_{R+G1}$ and the illuminating light $11_R+11_{G1}$ interfere with each other in the photosensitive material 1. Thus, a hologram of the object o for the wavelength of 647 nm and a hologram of the object O for the wavelength of 580 nm are double-recorded in the photosensitive material 1. Then, the photosensitive material 1 is subjected to prescribed UV irradiation and baking as post-treatment.

Figure 7:
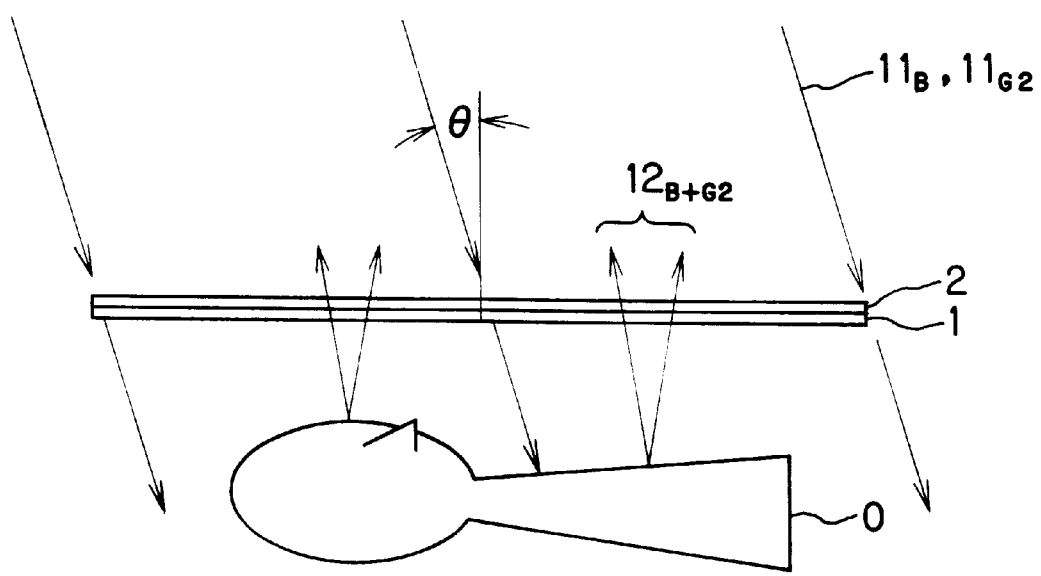
FIG. 7 is a diagram showing a step subsequent to the step of the process shown in FIG. 6.

Next, as shown in FIG. 7, a photosensitive material 2 for a second layer is stacked over the first-layer photosensitive material 1 treated as described above with a pressure-sensitive adhesive layer interposed therebetween. Then, the object O is placed on the reverse side of the photosensitive material 2 in the same positional relationship as in FIG. 6. With this arrangement, argon laser light $11_B$ of wavelength 458 nm in the blue region and argon laser light $11_{G2}$ of 514.5 nm as another wavelength in the green region are applied at the same incident angle θ from the photosensitive material 2 side as illuminating light with a total exposure energy of 15 mJ/cm$^2$. Consequently, the illuminating light $11_B+11_{G2}$ passes through both the photosensitive material 2 and the already-exposed photosensitive material 1 (which has already been fixed to become inert at this stage) and is incident on the object O. As a result, scattered light $12_{B+G2}$ is produced in the reflection direction from the object O. The scattered light $12_{B+G2}$ and the illuminating light $11_B+11_{G2}$ interfere with each other in the photosensitive material 2. Thus, a hologram of the object O for the wavelength of 458 nm and a hologram of the object O for the wavelength of 514.5 nm are double-recorded in the photosensitive material 2. Then, the photosensitive material 2 is subjected to prescribed UV irradiation and baking as post-treatment.

Figure 8:
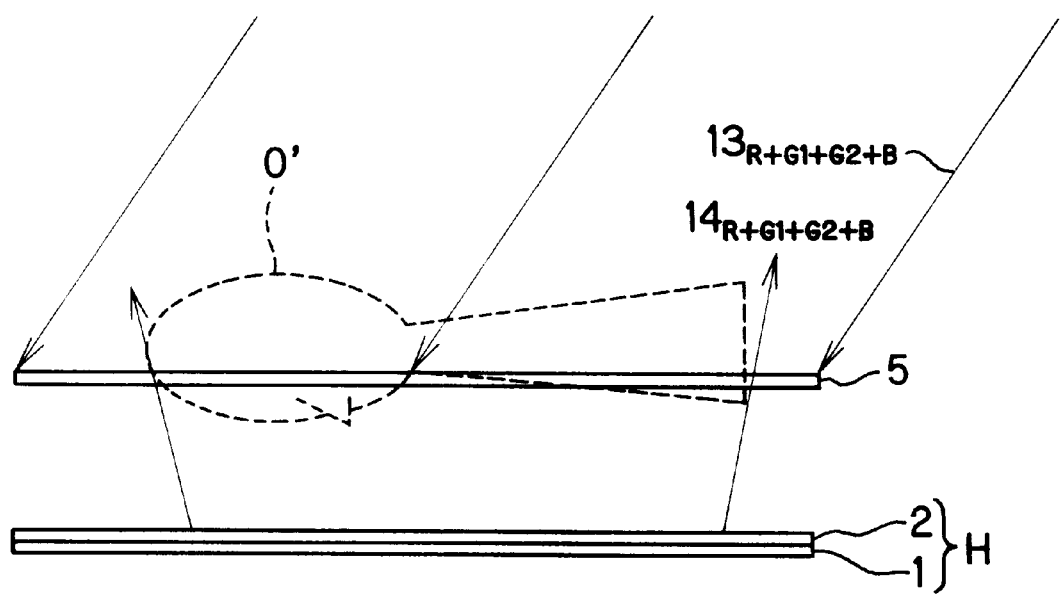
FIG. 8 is a diagram showing a process of reproducing a hologram from a hologram original plate obtained by the process shown in FIGS. 6 and 7.
Figure 9A:
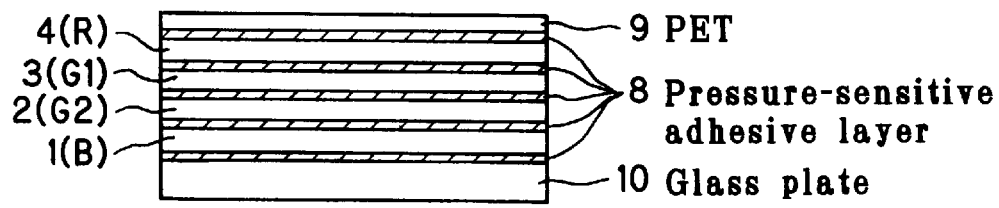
FIGS. 9(a)–9(e) are diagrams showing examples of the layer configuration of a hologram original plate and examples of the combination of colors recorded in each layer.
Figure 9B:
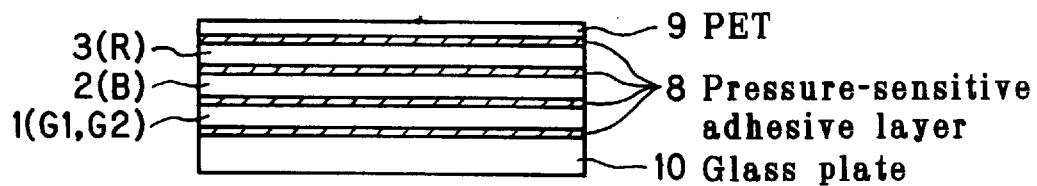
Figure 9C:
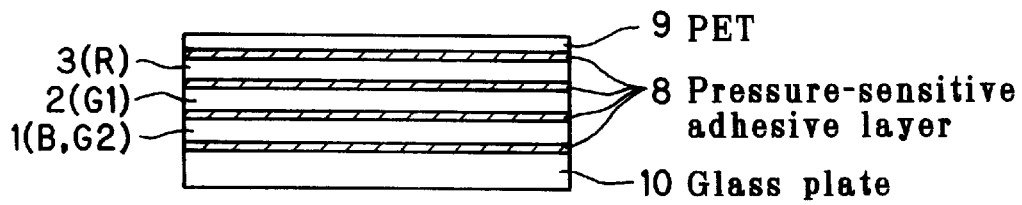
Figure 9D:
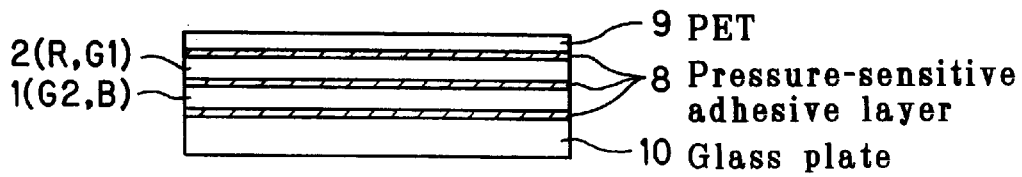
Figure 9E:
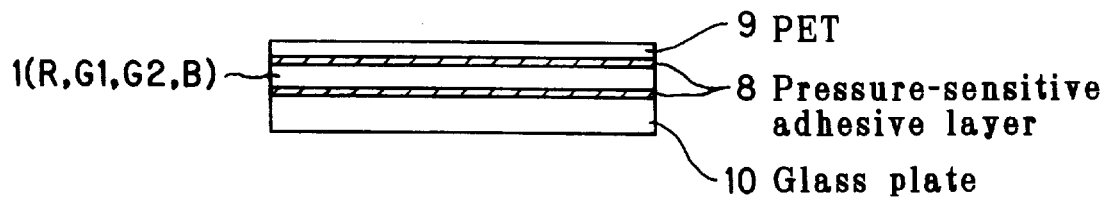

Thus, a hologram original plate H is formed from a stack of two layers subjected to exposure and post-treatment for each wavelength. The hologram original plate H is used to reproduce a full-color hologram in a photosensitive material consisting essentially of a single layer of volume hologram photosensitive material [photopolymer HRF800X001 (manufactured by Du Pont Co., Ltd.)] by using the same four wavelengths. For this purpose, as shown in FIG. 8, another photosensitive material 5 is placed in the vicinity of the position of the object O at the time of photographically recording the hologram original plate H. Then, illuminating light $13_{R+G1+G2+B}$ of the same four wavelengths 647 nm, 580 nm, 514.5 nm and 458 nm as those used at the time of recording the hologram original plate H is applied simultaneously from the photosensitive material 5 side in a direction opposite to the direction of incidence of the illuminating light $11_{G1}$, $11_{G2}$, $11_B$ and $11_R$ at the time of producing the hologram original plate H. Consequently, the illuminating light $13_{R+G1+G2+B}$ passes through the photosensitive material 5 and is incident on the hologram original plate H. As a result, diffracted light $14_{R+G1+G2+B}$ is produced in the reflection direction from the hologram original plate H and reconstructs a real image O' of the recorded object O in the vicinity of the plane of the photosensitive material 5. The diffracted light $14_{R+G1+G2+B}$ and the illuminating light $13_{R+G1+G2+B}$ interfere with each other in the photosensitive material 5. Thus, a full-color hologram image of the object O is recorded in the photosensitive material 5.

With respect to the hologram reproduced in this way, a pressure-sensitive adhesive PL THIN (manufactured by Lintec Corporation) stated in Japanese Patent Application No. Hei 10-97345 "Volume Hologram Laminate and Label for Producing Volume Hologram Laminate" filed by the present applicant and a pressure-sensitive adhesive P297F (manufactured by Lintec Corporation) stated in Japanese Patent Application No. Hei 11-287779 "Pressure-Sensitive Adhesive for Pressure-Sensitive Adhesive Layer in Volume Hologram Laminate" are stacked on the hologram photosensitive material layer 5 to shift the center wavelengths to the shorter wavelength side. More specifically, PET (polyethylene terephthalate) film provided as a protective layer for the surface of the reproduced hologram is removed. Thereafter, the pressure-sensitive adhesive P297F applied on PET film is bonded to the surface of the hologram, together with the PET film. The pressure-sensitive adhesive PL THIN is bonded to the reverse side of the hologram, together with the PET film. Then, prescribed UV irradiation is carried out. At this time, shrinkage of the pressure-sensitive adhesives causes each reconstruction wavelength of the hologram to shift about 25 nm to the shorter wavelength side as follows:

Reconstruction wavelength of red R::
  647 nm→620±5 nm
Reconstruction wavelength 1 of green G1:
  580 nm→555±5 nm
Reconstruction wavelength 2 of green G2:
  514.5 nm→490±5 nm
Reconstruction wavelength of blue B:
  458 nm→434±5 nm When the hologram produced in this way is illuminated with white light to reconstruct a holographic image, the above-described four reconstruction wavelengths are available as dominant wavelengths. Thus, it is possible to obtain a full-color hologram providing a brighter image and a wider color reproduction range and exhibiting more improved color reproduction than in the case of the conventional hologram recorded with three wavelengths.

Regarding the layer configuration of the hologram original plate H and the combination of colors recorded in each layer in the foregoing embodiments, it is possible to use layer configurations and combinations of colors such as those shown in parts (a) to (e) of FIG. 9, by way of example, in addition to those stated above. It should be noted that the layer configuration and the combination of colors shown in part (b) of FIG. 9 are the same as in the first and second embodiments.

In part (a) of FIG. 9, a blue reproducing hologram is recorded with a wavelength in the blue region in a first photosensitive material layer 1 bonded to the top of a glass plate 10 through a pressure-sensitive adhesive layer 8. A green reproducing hologram is recorded with a second wavelength in the green region in a second photosensitive material layer 2 bonded to the top of the first photosensitive material layer 1 through a pressure-sensitive adhesive layer 8. Another green reproducing hologram is recorded with a first wavelength in the green region in a third photosensitive material layer 3 bonded to the top of the second photosensitive material layer 2 through a pressure-sensitive adhesive layer 8. Further, a red reproducing hologram is recorded with a wavelength in the red region in a fourth photosensitive material layer 4 bonded to the top of the third photosensitive material layer 3 through a pressure-sensitive adhesive layer 8. Finally, a PET film 9 as a protective layer is bonded to the top of the fourth photosensitive material layer 4 through a pressure-sensitive adhesive layer 8.

In part (b) of FIG. 9, two green reproducing holograms are double-recorded with first and second wavelengths in the green region in a first photosensitive material layer 1 bonded to the top of a glass plate 10 through a pressure-sensitive adhesive layer 8. A blue reproducing hologram is recorded with a wavelength in the blue region in a second photosensitive material layer 2 bonded to the top of the first photosensitive material layer 1 through a pressure-sensitive adhesive layer 8. A red reproducing hologram is recorded with a wavelength in the red region in a third photosensitive material layer 3 bonded to the top of the second photosensitive material layer 2 through a pressure-sensitive adhesive layer 8. Finally, a PET film 9 as a protective layer is bonded to the top of the third photosensitive material layer 3 through a pressure-sensitive adhesive layer 8.

In part (c) of FIG. 9, a blue reproducing hologram and a second green reproducing hologram are double-recorded with a wavelength in the blue region and a second wavelength in the green region in a first photosensitive material layer 1 bonded to the top of a glass plate 10 through a pressure-sensitive adhesive layer 8. A first green reproducing hologram is recorded with a first wavelength in the green region in a second photosensitive material layer 2 bonded to the top of the first photosensitive material layer 1 through a pressure-sensitive adhesive layer 8. A red reproducing holo- gram is recorded with a wavelength in the red region in a third photosensitive material layer 3 bonded to the top of the second photosensitive material layer 2 through a pressure-sensitive adhesive layer 8. Finally, a PET film 9 as a protective layer is bonded to the top of the third photosensitive material layer 3 through a pressure-sensitive adhesive layer 8.

In part (d) of FIG. 9, a blue reproducing hologram and a second green reproducing hologram are double-recorded with a wavelength in the blue region and a second wavelength in the green region in a first photosensitive material layer 1 bonded to the top of a glass plate 10 through a pressure-sensitive adhesive layer 8. Further, a first green reproducing hologram and a red reproducing hologram are double-recorded in a second photosensitive material layer 2 bonded to the top of the first photosensitive material layer 1 through a pressure-sensitive adhesive layer 8. Finally, a PET film 9 as a protective layer is bonded to the top of the second photosensitive material layer 2 through a pressure-sensitive adhesive layer 8.

In part (e) of FIG. 9, four holograms, i.e. a red reproducing hologram, first and second green reproducing holograms, and a blue reproducing hologram, are multiple-recorded with four wavelengths, i.e. a wavelength in the red region, first and second wavelengths in the green region, and a wavelength in the blue region, in a photosensitive material layer 1 bonded to the top of a glass plate 10 through a pressure-sensitive adhesive layer 8. Then, a PET film 9 as a protective layer is bonded to the top of the photosensitive material layer 1 through a pressure-sensitive adhesive layer 8.

It should be noted that the layer stacking order in the above-described layer configurations is optional. The pressure-sensitive adhesive layers may be omitted. In such a case, a barrier layer may be provided between a pair of adjacent photosensitive material layers. If necessary, a pressure-sensitive adhesive layer may be provided on either or each side of the barrier layer.

Although the full-color hologram and the method of producing the same according to the present invention have been described above on the basis of the principles and embodiments thereof, the present invention is not limited to the foregoing embodiments but can be modified in a variety of ways.

As will be clear from the foregoing description, the full-color hologram according to the present invention has one reconstruction wavelength in the vicinity of the peak wavelength 555 nm of the spectral luminous efficiency curve, i.e. in the range of 550 nm to 560 nm, and further has three other reconstruction wavelengths in the three primary color regions of red, blue and green, i.e. in the three regions of 615 nm to 680 nm, 380 nm to 470 nm, and 485 nm to 515 nm, respectively. Therefore, it is possible to obtain a full-color hologram capable of generating a bright image and reproducing colors in all color regions with favorable reproducibility. The full-color hologram according to the present invention is usable, for example, as a graphic art hologram, a holographic reflection panel, etc.

What we claim is:

1. A full-color hologram formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively.

2. A method of producing a full-color hologram, said full-color hologram being formed by multiple recording or multilayer recording with four different dominant wavelengths for reconstruction, and said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, wherein as a first recording wavelength in a green region, 514.5 nm from an argon laser or 532 nm from an LD pumped laser is used, and wherein as a second recording wavelength in the green region, a wavelength not shorter than 555 nm is used.

3. A method of producing a full-color hologram according to claim 2, wherein as the second recording wavelength in the green region, a wavelength in a range of 565 nm to 590 nm is used, and wherein the reconstruction wavelengths are shifted 15 nm to 40 nm to a shorter wavelength side by shrinkage of a photosensitive material after recording or by wavelength shift effected by a pressure-sensitive adhesive.

4. A method of producing a full-color hologram according to claim 2 or 3, wherein as the second recording wavelength in the green region, a wavelength in a range of 565 nm to 600 nm from a dye laser is used.

5. A method of producing a full-color hologram, said full-color hologram being formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, and said full-color hologram being made by holographic duplication from a hologram original plate, wherein said hologram original plate is formed from a stack of four layers of photosensitive material, each layer containing a hologram recorded for each corresponding wavelength.

6. A method of producing a full-color hologram, said full-color hologram being formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, and said full-color hologram being made by holographic duplication from a hologram original plate, wherein said hologram original plate is formed by:

recording a wavelength in a red region and one wavelength in a green region in a first layer of photosensitive material;

recording a wavelength in a blue region and another wavelength in the green region in a second layer of photosensitive material; and stacking the first and the second layers on top of each other.

7. A method of producing a full-color hologram, said full-color hologram being formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, and said full-color hologram being made by holographic duplication from a hologram original plate, wherein said hologram original plate is formed by:

recording a wavelength in a red region in a first layer of photosensitive material;

recording two wavelengths in a green region in a second layer of photosensitive material that is different from the first layer;

recording a wavelength in a blue region in a third layer of photosensitive material that is different from the first and the second layers; and stacking the first, the second, and the third layers on top of each other.

8. A method of producing a full-color hologram, said full-color hologram being formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, and said full-color hologram being made by holographic duplication from a hologram original plate, wherein said hologram original plate is formed by:

recording a wavelength in a red region in a first layer of photosensitive material;

recording one wavelength in a green region in a second layer of photosensitive material that is different from the first layer;

recording another wavelength in the green region and a wavelength in a blue region in a third layer of photosensitive material that is different from the first the second layers; and stacking the first, the second, and the third layers on top of each other.

9. A method of producing a full-color hologram, said full-color hologram being formed by multiple recording or multilayer recording with four different dominant wavelengths for reconstruction, said full-color hologram having one reconstruction wavelength in a range of 550 nm to 560 nm, and further having three other reconstruction wavelengths in the ranges of 615 nm to 680 nm, 380 nm to 470 nm, and 485 nm to 515 nm, respectively, and said full-color hologram being made by holographic duplication from a hologram original plate, wherein said hologram original plate is formed by recording four wavelengths in a same layer of photosensitive material.

* * * * *